(12) United States Patent
Sylthe et al.

(10) Patent No.: US 7,895,230 B2
(45) Date of Patent: *Feb. 22, 2011

(54) METHOD OF FINDING A SEARCH STRING IN A DOCUMENT FOR VIEWING ON A MOBILE COMMUNICATION DEVICE

(75) Inventors: Olav A. Sylthe, Atlanta, GA (US); Jianwei Yuan, Cumming, GA (US); Dan Dumitru, Atlanta, GA (US)

(73) Assignee: Research In Motion Limited, Waterloo, Ontario (CA)

( * ) Notice: Subject to any disclaimer, the term of this patent is extended or adjusted under 35 U.S.C. 154(b) by 240 days.

This patent is subject to a terminal disclaimer.

(21) Appl. No.: 11/746,413

(22) Filed: May 9, 2007

(65) Prior Publication Data

US 2007/0266010 A1 Nov. 15, 2007

Related U.S. Application Data

(63) Continuation of application No. 11/001,504, filed on Dec. 1, 2004, now Pat. No. 7,277,890.

(51) Int. Cl.
*G06F 17/30* (2006.01)
(52) U.S. Cl. .................................. 707/770
(58) Field of Classification Search ........... 707/770
See application file for complete search history.

(56) References Cited

U.S. PATENT DOCUMENTS

| 6,054,990 | A | 4/2000 | Tran | |
|---|---|---|---|---|
| 7,107,536 | B1* | 9/2006 | Dowling | 715/738 |
| 2002/0161796 | A1* | 10/2002 | Sylthe | 707/500 |
| 2004/0100510 | A1* | 5/2004 | Milic-Frayling et al. | 345/864 |
| 2005/0108636 | A1* | 5/2005 | Sylthe et al. | 715/525 |
| 2006/0047743 | A1* | 3/2006 | Yuan et al. | 709/203 |
| 2006/0056334 | A1* | 3/2006 | Yuan et al. | 370/328 |

FOREIGN PATENT DOCUMENTS

WO WO 01/65354 A1 9/2001

OTHER PUBLICATIONS

Arizan ("AirDoc Mobile Reader for RIM BlackBerry 857/957 Documentation", (2001), pp. 1-26).*

Arizan ("AirDoc Mobile Reader for RIM BlackBerry 857/957 R1 R1.1", (Feb. 4, 2002), WebMediaBrands Inc., pp. 1-3).*

N. Milic-Frayling et al, "SmartView and SearchMobil: Providing Overview and Detail in Handheld Browsing", Mobile HCI 2003 International Workshop, Aug. 8, 2003, pp. 158-171, XP-002318043.

(Continued)

*Primary Examiner*—James Trujillo
*Assistant Examiner*—Dawaune Conyers
(74) *Attorney, Agent, or Firm*—Eckert Seamans Cherin & Mellott, LLC; Brij K. Agarwal, Esquire

(57) ABSTRACT

A server find process by which a user enters a search term for a document attachment into his/her mobile communication device. If no occurrences of the term are found on the device, the device then prompts the user to initiate a server side search. If the user accepts, then the server searches the document attachment and returns the first section of text that contains the search term to the device for viewing by the user. This process can then be repeated until the server find feature reports that no further instances of the search string have been found on the server.

18 Claims, 11 Drawing Sheets

OTHER PUBLICATIONS

Y. Chen et al., "Detecting Web Page Structure for Adaptive Viewing on Small Form Factor Devices", The Twelfth International World Wide Web Conference, May 20, 2003, 9 pp.

H-Y Kao et al., "DOMISA: DOM-based Information Space Adsorption for Web Information Hierarchy Mining", Proceedings of the 4th Siam Int'l Conference on Data Mining, Apr. 22, 2004, 9 pp.

* cited by examiner

```
Code Connventions.doc
5.2 Const usage 6
5.3 Memory management 6
5.4 Parameter passing 6
5.5 Type conversions 7
5.6 Search for
    comments
1 Introduction
Skipped Content: 1.7 Kb
#endif // CMYCLASS_H
```

*FIG.8A*

```
Code Connventions.doc
5.2
Wh   ?   Reached the end of the section.        e
use      Perform server side search             ty.
Th       from the start of the
         document?
                              Yes
5.3                           No
Me
done exclusively using the C++ operators NEW
AND DELETE. The use of C functions like
```

*FIG.8B*

Code Connventions.doc line. E.g.

}

//

{

3.3

⚠ Reached the end of the section.

The default comment style use in the code should be the new C++ style based of two consective forward slashes (//). The use of the C style comments (/**/) is not

*FIG. 9*

METHOD OF FINDING A SEARCH STRING IN A DOCUMENT FOR VIEWING ON A MOBILE COMMUNICATION DEVICE

CROSS-REFERENCE TO RELATED APPLICATION

The instant application is a voluntary continuation application of U.S. patent application Ser. No. 11/001,504 filed Dec. 1, 2004 now U.S. Pat. No. 7,277,890, the disclosures of which are incorporated herein by reference.

TECHNICAL FIELD

The following is directed in general to displaying content on mobile communication devices, and more particularly to a method for finding a search string in a document attachment and viewing the corresponding section on a mobile communication device without retrieving the full document content.

BACKGROUND

Mobile communication devices are becoming increasingly popular for business and personal use due to a relatively recent increase in number of services and features that the devices and mobile infrastructures support. Handheld mobile communication devices, sometimes referred to as mobile stations, are essentially portable computers having wireless capability, and come in various forms. These include Personal Digital Assistants (PDAs), cellular phones and smart phones. While their reduced size is an advantage to portability, bandwidth and processing constraints of such devices present challenges to the downloading and viewing of documents, such as word processing documents, tables and images.

Electronic documents are produced using various computer programs, such as word processors, spreadsheet programs, financial software, and presentation software. It is customary to provide a "Find" command in such programs for quickly locating a search string of interest in a document, etc., without the user being required to read through the entire document.

The downloading of an entire document to a mobile communication device consumes a large amount of bandwidth, especially when the document is very large. In addition, viewing even a portion of such a downloaded document on the device consumes substantial device CPU/memory/battery resources.

For example, if a user wishes to view only a paragraph in a section in the middle of a 400-page document, the section that contains some of the default properties for the paragraph, or even the entire document, must be transmitted to the mobile communication device. Yet, the user only views a small portion of the document on the mobile communication device.

Consequently, it is known in the art to provide an attachment server to deliver on-demand content to the user of a mobile communication device in order to minimize bandwidth, and device CPU/memory usage. This content may then be viewed on the device using an attachment viewer.

Currently, the "Find" command within the attachment viewer on a mobile communication device can only find a user entered search term if the attachment content already is present on the device (i.e. it has already been retrieved/downloaded to the device).

Some document attachments can easily be in the range of several hundred pages or contain large amounts of textual information, as indicated above. For a user to be able to find all occurrences of a search term for such a large document attachment, all of the content must be retrieved to the device from the server in a sequential fashion. This is a very time consuming as well as a bandwidth and device CPU/memory intensive operation.

SUMMARY

A solution is set forth herein to the problem of having to retrieve the entire content of a document attachment to a mobile communication device in order to find all occurrences of a search string within the document. Specifically, a server find function is provided for initiating a search on the attachment server and returning only the appropriate section(s) containing the search term to the device. Any skipped (i.e. non-retrieved document content) may be visually indicated to the user for later retrieval according to the principles set forth in copending US patent application no. PUS2279, the content of which is incorporated by reference. The non sequential access according to the present server find function allows for minimized bandwidth usage and a better on demand attachment viewing experience.

The server find feature set forth herein is a device and server side function that allows a user to enter a search term for a document attachment into his/her mobile communication device. If no (or any more) occurrences of the term are found on the device, the device then prompts the user to initiate a server side search. If the user accepts, then the server searches the document attachment and returns the first section of text that contains the search term to the device for viewing by the user. This approach can then be repeated until the server find feature reports that no further "hits" have been found on the server.

Additional aspects and advantages will be apparent to a person of ordinary skill in the art, residing in the details of construction and operation as more fully hereinafter described and claimed, reference being had to the accompanying drawings.

BRIEF DESCRIPTION OF THE DRAWINGS

A detailed description of the preferred embodiment is set forth in detail below, with reference to the following drawings, in which:

FIGS. 8A and 8B show a graphical user interface on the mobile communication device for invoking the server find command;

FIG. 9 shows a message on the graphical user interface indicating that a search string has not been found;

DETAILED DESCRIPTION OF THE PREFERRED EMBODIMENT

Figure 1:
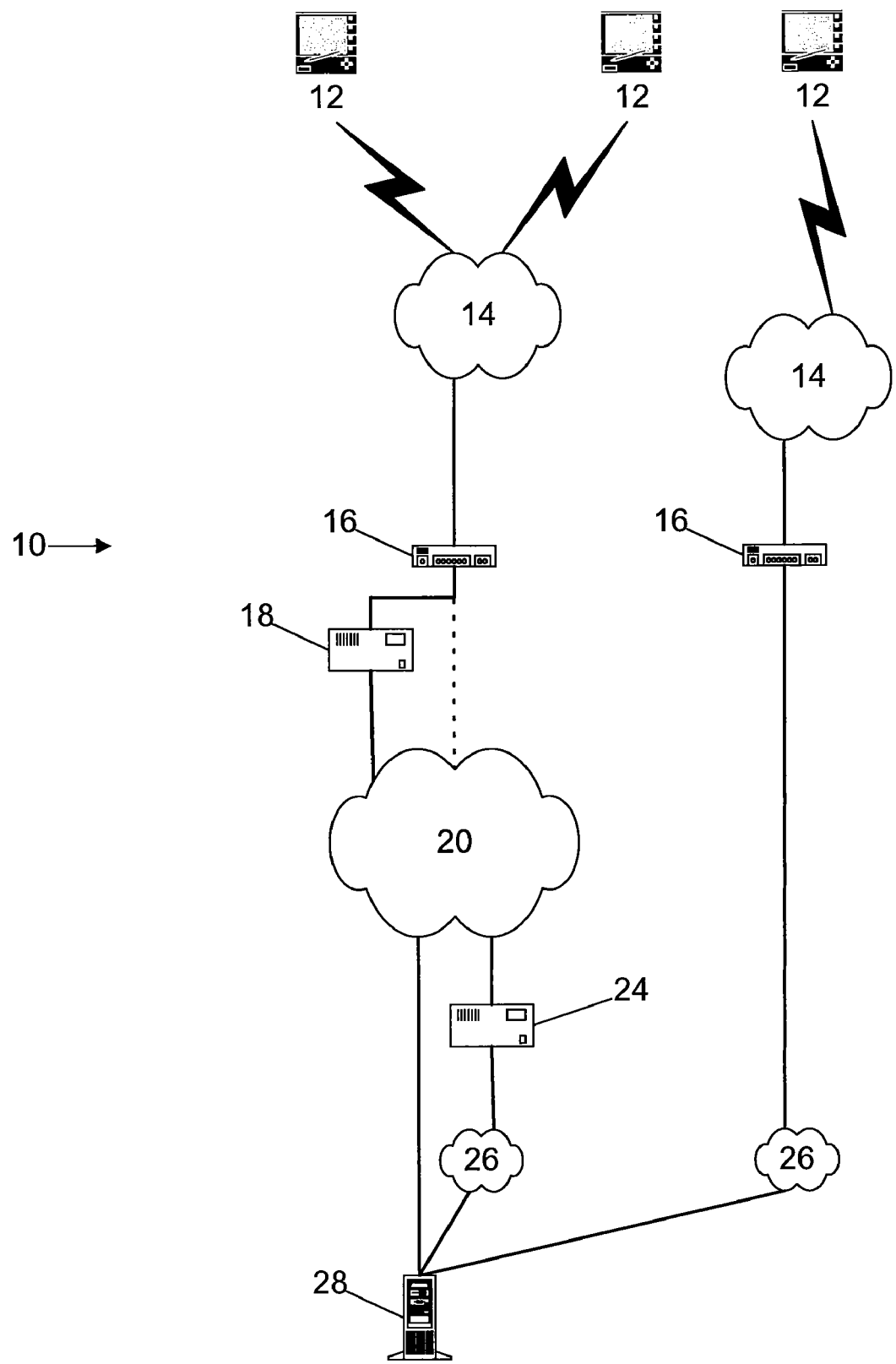
FIG. 1 is a block diagram of a network environment in which the preferred embodiment may be practiced.

With reference to FIG. 1, network environment 10 is shown in which the preferred embodiment may be practiced. Network environment 10 includes mobile devices 12 communicating via a wireless network 14 to a server 28 for downloading document attachments to the mobile devices 12. While only one server 28 is shown for illustration purposes, a person of skill in the art will understand that network environment 10 could have many such servers for hosting web sites or graphic download sites, providing access to picture files such as JPEG, TIFF, BMP, PNG, SGI, MP4, MOV, GIF, SVG, etc. As would be understood by one of ordinary skill in the art, wireless networks 14 include GSM/GPRS, CDPD, TDMA, iDEN Mobitex, DataTAC networks, or future networks such as EDGE or UMTS, and broadband networks like Bluetooth and variants of 802.11.

A connection to a fixed service requires special considerations, and may require special permission as authorized through a Network Access Point (NAP) 16. For generic services, such as web access, a proxy-gateway or Network Address Translator (NAT) 18 may be provided so that a network operator can control and bill for the access. NATs 18 enable management of a limited supply of public Internet addresses for large populations of wireless mobile devices. Solutions offered by a proxy-gateway or NAT 18 often involve a complex infrastructure, and thus may be managed by value-added service providers (VASPs), which provide, for instance, WAP gateways, WAP proxy gateway solutions, multi-media messaging servers (MMS) and Internet Multi-Media Services (IMS).

Private Intranet services 26 may require an associated Private Intranet Proxy Gateway 24 for accessing content on server 28. Such private services include WML access to corporate mail systems, HTML access to CRM databases, or any other services that deliver information as formatted data with links and URLs embedded. As shown, it is possible that a private service 26 may be connected directly to the wireless network 14, as opposed to being connected via Internet 20.

Referred to throughout this document, for the purpose of describing the preferred embodiment, is the structure of a Document Object Model (DOM) for a document attachment to be viewed on a mobile device 12.

The attachment server 28 uses a file-parsing distiller in the preferred embodiment, for a specific document type, to build an in-memory Document Object Model (DOM) structure representing an attachment of that document type. The document DOM structure is stored in a memory cache of server 28, and can be iterated bi-directionally.

Figure 2:
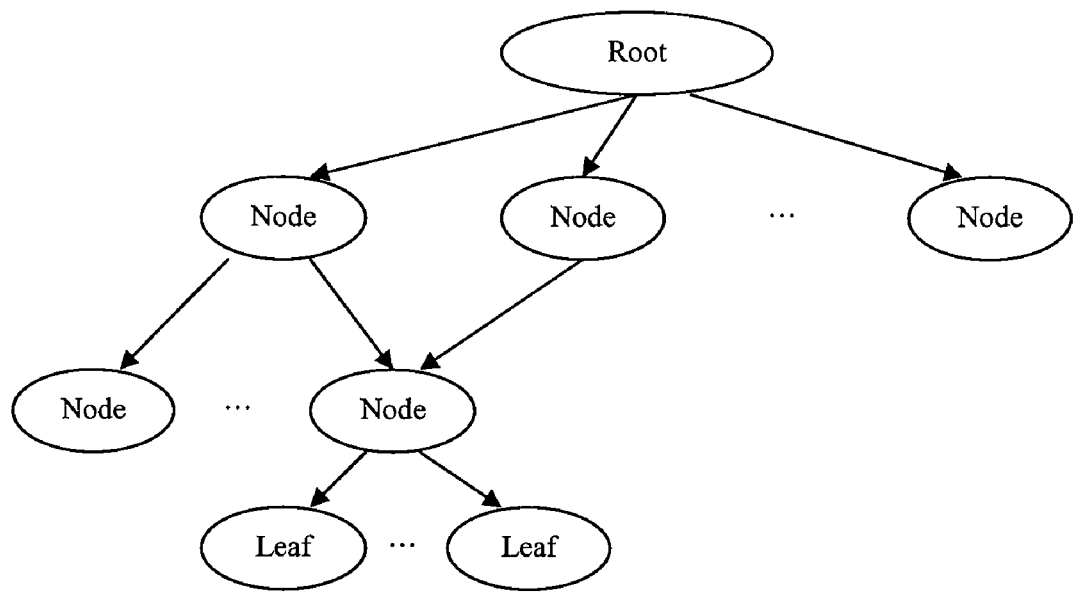
FIG. 2 is a tree diagram showing the basic structure of a Document Object Model (DOM) used in the preferred embodiment.

As shown in FIG. 2, the graph-based document DOM structure consists of nodes and leaves. The nodes serve as the parents of leaves and nodes, while leaves are end points of a branch in the graph. Each node and leaf can have a set of attributes to specify its own characteristics. For example, a paragraph node can contain attributes to specify its alignment, style, entry of document TOC, etc. In addition, each of the nodes and the leaves has a unique identifier, called a DOM ID, to identify itself in the document DOM structure.

The document DOM structure is divided into three parts: top-level, component and references. The top level refers to the document root structure, while the main document is constructed in the component and the references represent document references to either internal or external sub-document parts. The following paragraphs examine each part in detail.

Figure 3:
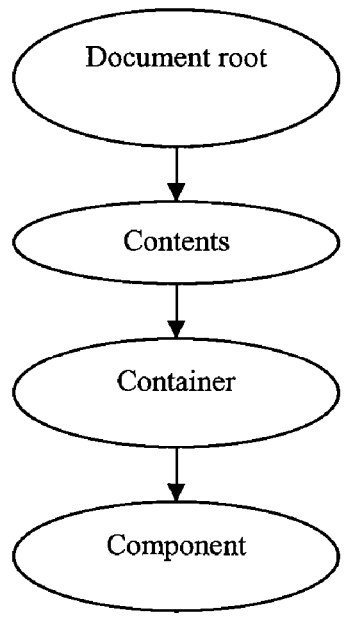
FIG. 3 shows the top-level of the DOM structure in FIG. 2.

The root node of a document DOM structure, referred to as "Document", contains several children nodes, referred to as "Contents", which represent different aspects of the document contents. Each "Contents" node contains one or multiple "Container" nodes used to store various document global attributes. The children of the "Container" nodes are components, which store the document structural and navigational information. When the attachment server 28 builds the DOM structure for an attachment file for the first time, the top-level structure is a single parent-child chain as shown in FIG. 3:

Three types of components are defined by the attachment server 28: text components, table components and image components, which represent text, tables and images in a document, respectively. The text and table components are described in detail below, and the image component structure is identical.

A component consists of a hierarchy of command nodes. Each command represents a physical entity, a property, or a reference defined in a document. For the text component, the physical entity commands are page, section, paragraph, text segments, comments, footnote and endnote commands, which by name define the corresponding entity contained in a document. The property commands for the text component are font, text color, text background color, hyperlink start/end and bookmark commands. The text component has only one reference command, referred to as the text reference command, which is used to reference a subdocument defined in the main body of a document. Usually, the children of a text component are page or section command nodes that, in turn, comprise a set of paragraph command nodes. The paragraph command can contain one or multiple nodes for the remaining command types.

Figure 4:
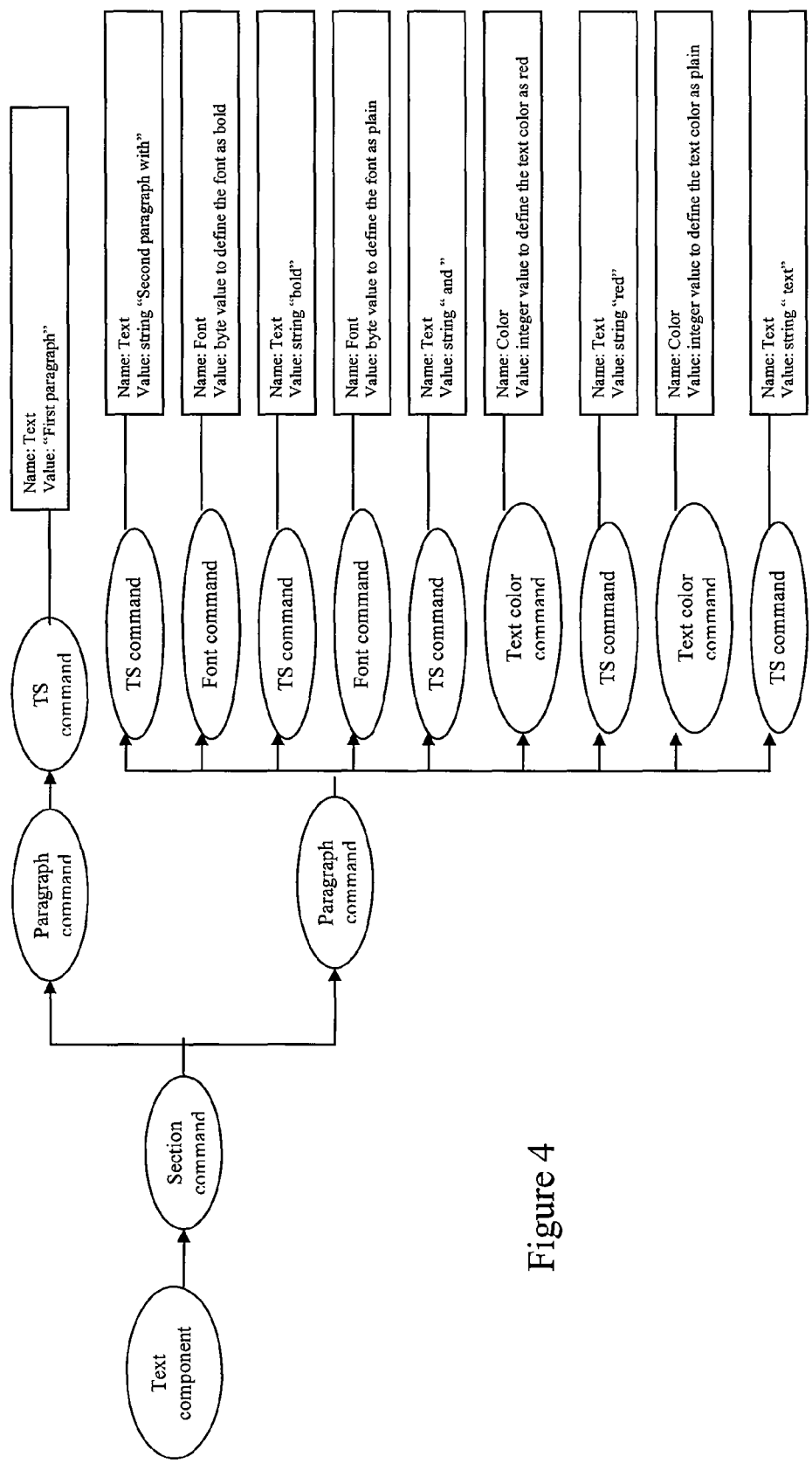
FIG. 4 shows an exemplary DOM structure for a word processing document.

Using the following sample text document, the corresponding document DOM structure is shown in FIG. 4:

---

First paragraph.
Second paragraph with bold and red text.

---

As FIG. 4 demonstrates, the section command, which is the child of the text component, consists of two paragraph commands. The first paragraph command contains one text segment command and the text content for that paragraph is added as an attribute to the text segment command. The second paragraph command has a relatively more complex structure, as the text properties in the paragraph are much richer. Each time a text property (font, text color, etc) changes, a corresponding text property command is created and the change value is added to that command as an attribute. The subsequent text segment command records the text with the same text property as an attribute. As document structure gets richer and more complex, more commands of corresponding types are created and the document properties are added as attributes to those commands.

The table component has the same three types of commands as the text component, but different command names. The document DOM structure for the sample

| Cell One | Cell Two |
|----------|----------|
| Cell Three | Cell Four |

Figure 5:
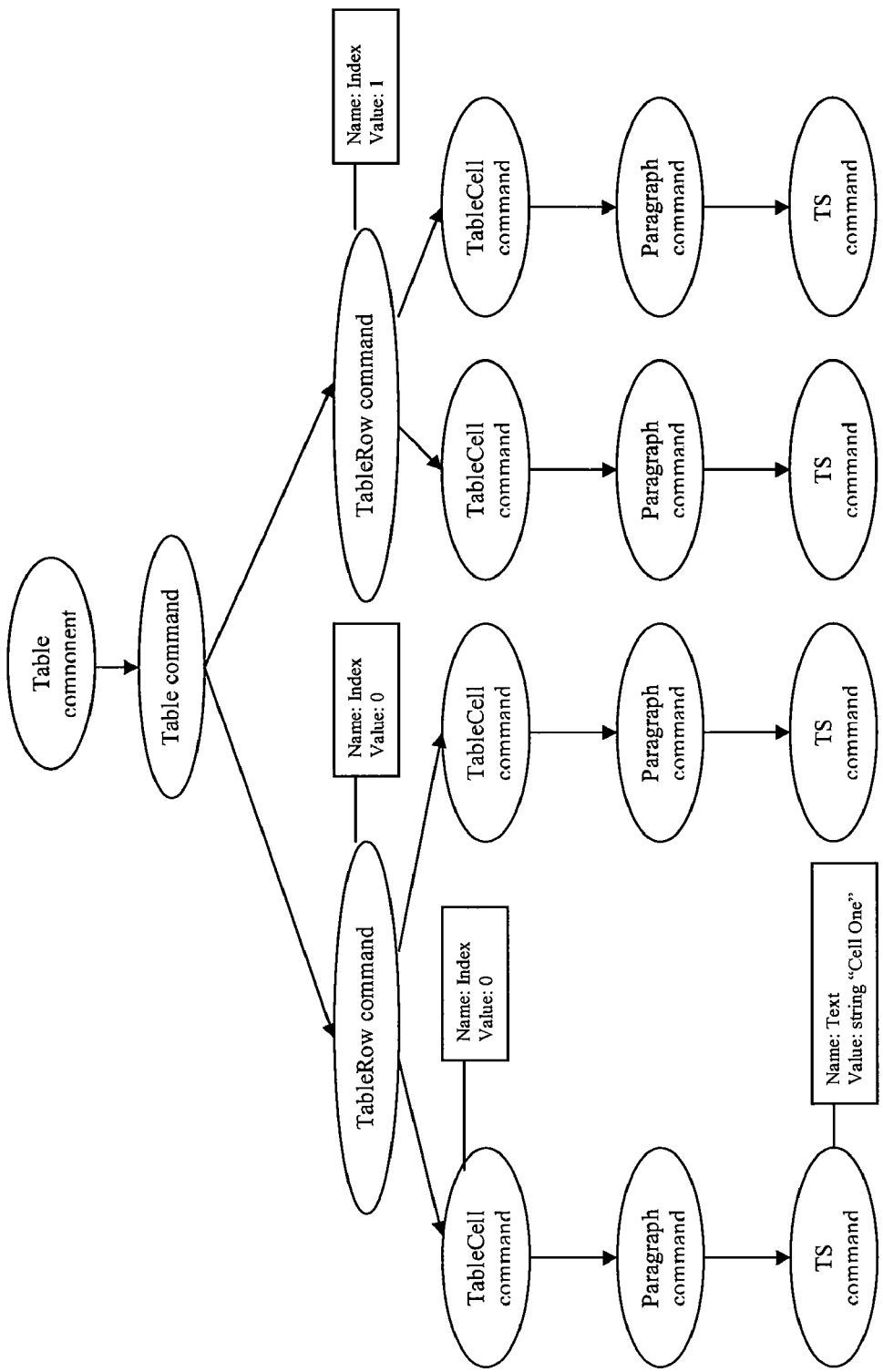
FIG. 5 shows an exemplary DOM structure for a table document.

As shown in the FIG. 5, the table component has physical entity type commands of table, tablerow and tablecell, where the tablecell command can contain all available commands for the text component. In the example above, the first child TableRow command of the table command has an attribute "Index" defined by value of 0. This indicates that the indicated table row is the first one defined in the table. The attribute of the leftmost table cell command in FIG. 5 has the same meaning.

Figure 12:
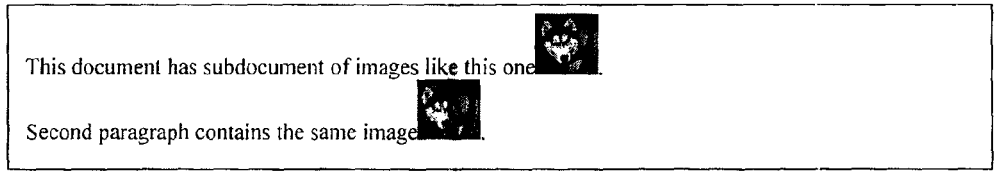
FIG. 12 is a sample document from which the DOM structure of FIG. 6 is generated.

A document sometimes contains subdocuments, for example images, tables, text boxes etc. The DOM structure set forth herein uses a reference command to point to the graph of such subdocuments. Thus, for the sample document of FIG. 12, the attachment server 28 generates the DOM structure shown in FIG. 6.

Figure 6:
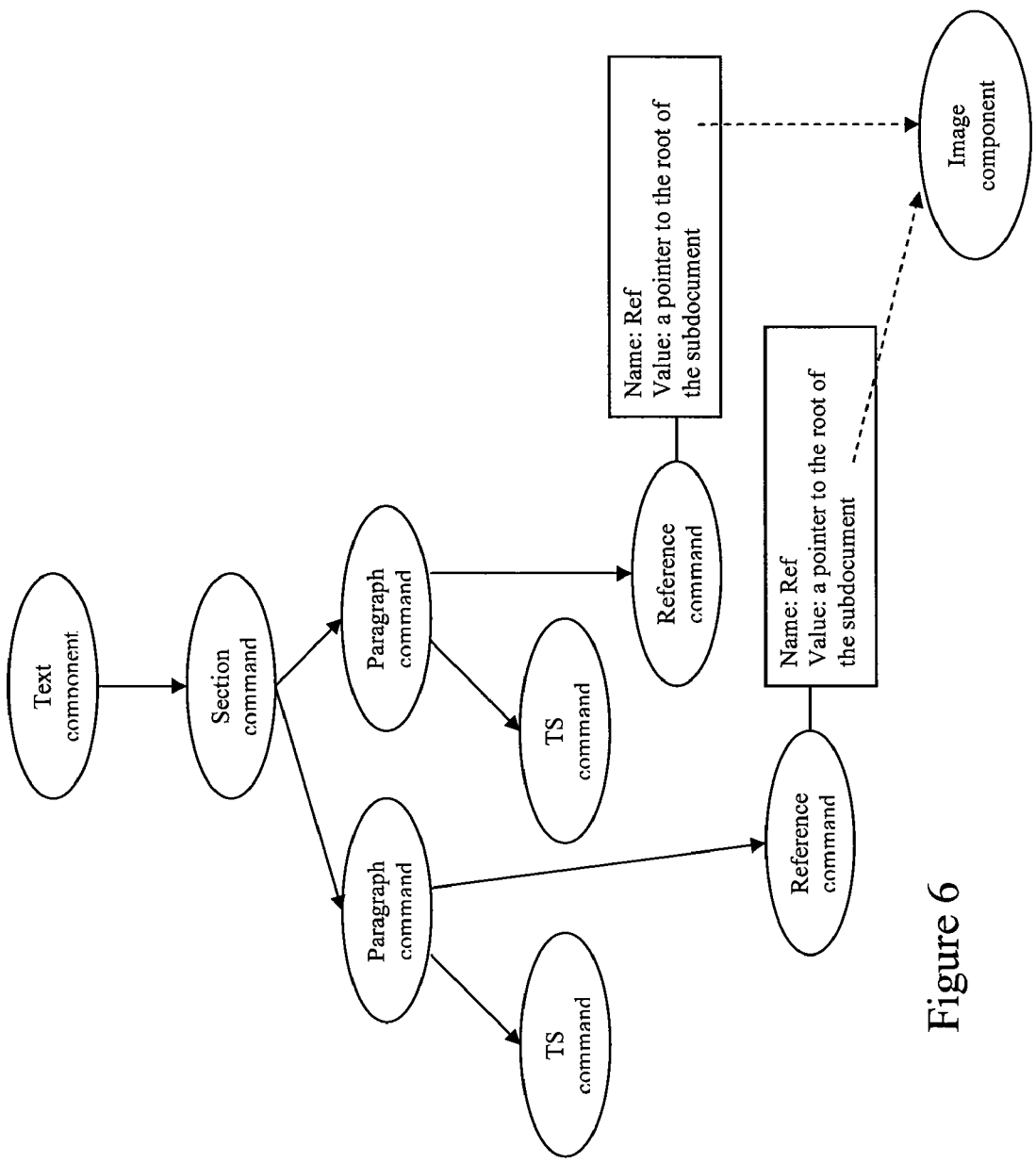
FIG. 6 shows an exemplary DOM structure for a word processing document containing an image subdocument.

The structure shown in FIG. 6 is identical to that discussed above in connection with FIGS. 4 and 5, except for the attributes of the two reference commands. The attachment server 28 constructs the image in "Sample Three" as a separate image component, which contains all of the image data in its own DOM hierarchy. In the DOM structure for the main document, the values of the "Ref" attributes of those two reference commands point to the image component, as indicated by the dashed lines, such that the DOM structure connects together all parts of the document.

Having described the document DOM structure used to implement the embodiment set forth herein, a detailed discussion will now be provided of document DOM structure construction and pagination also used to implement the embodiment.

Figure 7:
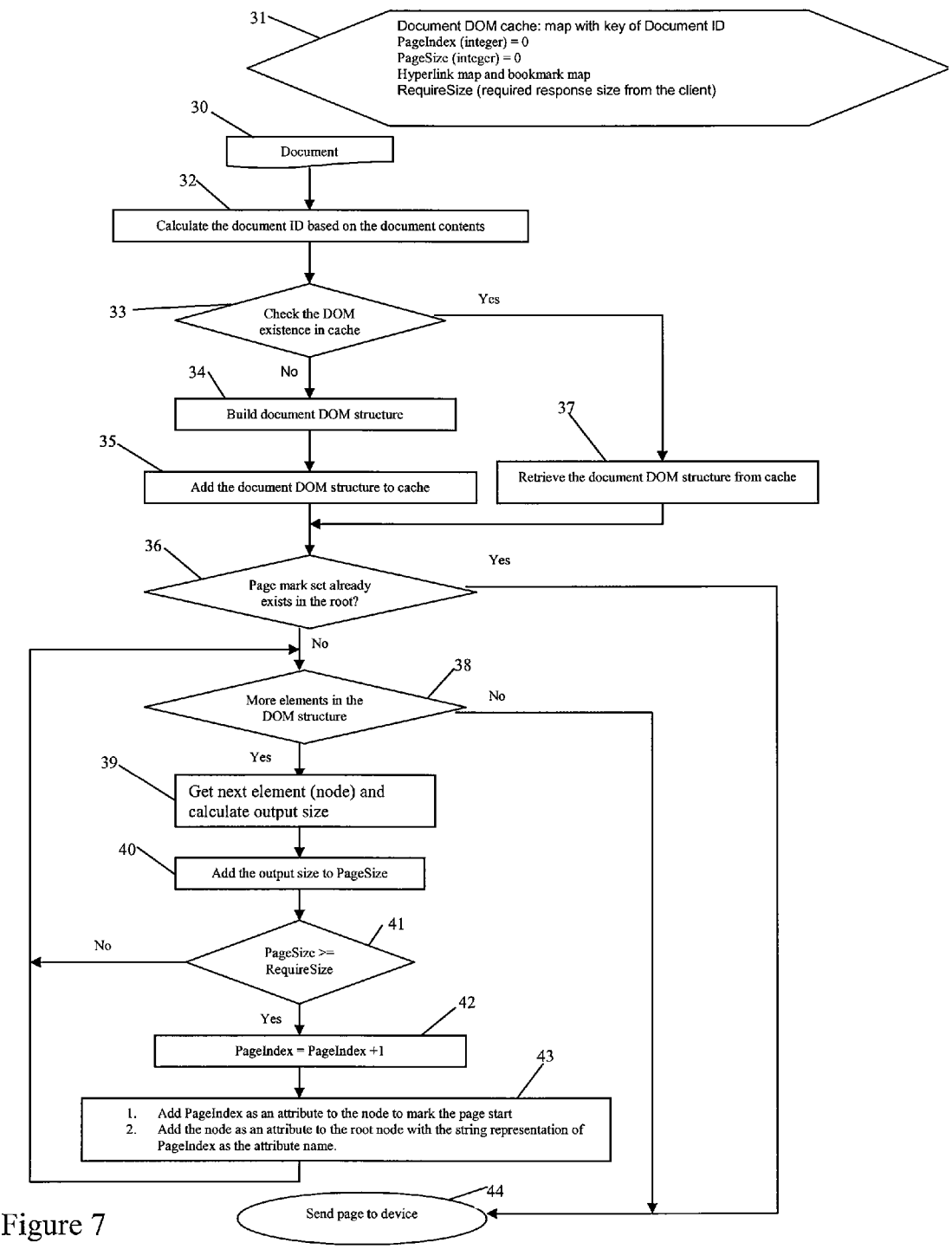
FIG. 7 is a flowchart showing document DOM structure construction and pagination.

The pagination function is a client and server side operation. FIG. 7 shows the processing steps, from which it will be noted that the server 28 uses a map in memory for document DOM cache storage and the key to the map is the document ID. Initially, when the user of a mobile communication device 12 sends a request to the server 28 to view a document, the device 12 sends two attributes and number of bytes it requires (RequireSize) as a response from the server (e.g. 3K bytes). The two attributes are whether the device is a color or monochrome device, and the screen size (width×height×color depth) of the device in pixels. Other information about the device 12 can also be transmitted to the server 28 (e.g. memory size). After the server 28 receives a document-viewing request, it starts the pagination process (step 30), and initializes the variables PageIndex and PageSize.

The following terms and variables are set forth in FIG. 7:

The PageIndex variable is defined in the server 28 and used by the server to record the current page index being paginated by the server. The page index is initially set to 0 indicating "Page 1".

PageSize is a variable defined in the server 28 and used by the server to record the current size for the page being paginated and is reset to 0 when paginating a new page.

Hyperlink map is a variable defined in the server 28, which is a container consisting of the element type of hyperlink node in the document DOM structure. The key (ID) for each element in the container is the hyperlink target string.

Bookmark map is a variable defined in the server 28 which is a container consisting of the element type of current page index (PageIndex value) for the bookmark in the document DOM structure. The key (ID) for each element in the container is the bookmark string.

The server process constructs a document ID (step 32) based on the document contents and uses the ID to check the document DOM cache (step 33) to determine whether the document DOM structure for that document has been constructed. If the document DOM structure does not exist in the cache, the server builds the DOM structure (step 34) for the document and adds it to the cache (step 35).

To construct the document ID, the original document file is opened in read and binary mode. The server 28 creates a MD5 Context structure, hashes the MD5 context structure with raw binary data byte-by-byte from the file, and finalizes the MD5 context structure and retrieves the 16 byte key for the file. The MD5 context structure has the following structure in syntax of C++ language

```
typedef struct
{
    unsigned long adwState[4];    /* state (ABCD) */
    unsigned long adwCount[2];    /* number of bits, modulo 2^64
    (lsb first) */
    unsigned char abyBuffer[64];  /* input buffer */
} tMD5_CTX;
```

Caching the document DOM structure requires considerable memory, and therefore increases the overall hardware deployment cost. On the other hand, building the DOM structure for a document is even more time and CPU intensive in contrast to the document key construction operation, especially for big documents. Since that processing time is more critical than hardware deployment cost for wireless operation, caching the document DOM is the approach adopted for the preferred embodiment, rather than building the DOM structure for the document each time the server receives a viewing request and then discarding the structure after sending the response back to the client device 12.

Once the document DOM structure has been built and stored in the cache, the server 28 determines whether a page mark has already been set in the root (step 36). If not, the server traverses through the DOM structure (steps 38, 39, 40 and 41) and calculates the output size (PageSize) for each node in the DOM structure based on the number of bytes (RequireSize) provided by the device 12. The server increments the PageIndex (step 42), adds it as an attribute to each node in order to mark the start of each page, and adds each node as an attribute to the root node with the string representation of PageIndex as the attribute name (step 43). Following this pagination function, the attachment server 28 transmits the document page-by-page to the requesting mobile device 12 based on client generated requests (step 44).

The page mark attribute name is associated with the device information and required response size (RequireSize) provided by the device 12, to enable the server to paginate through the document DOM structure and generate the response based on the device capability. For example if the device is a monochrome type, the color information contained inside the DOM structure will be ignored during the server pagination and response generation operations and therefore optimize the wireless bandwidth utilization.

Since the key to the memory map is the document ID, the algorithm used to calculate the document ID (step 32) must guarantee the uniqueness of the key. According to the best mode, as set forth above, the algorithm used inside the server 28 is the MD5 messaging encryption algorithm invented by Professor Ronald L. Rivest of MIT Laboratory for Computer Science and RSA Data Security, Inc. There are several other hashing options that can be used. However MD5 is the most efficient and reliable one based on the broad range of different document content required to be processed by the server 28.

Consider the example of a user requesting to view a document attachment that consists of 200 pages of textual content. The server 28 receives the initial conversion request from device 12 to convert the document attachment and in response constructs a Document Object Model (DOM) for the document content. The server then returns the first chunk (i.e. page) of the content back to the device. The server also returns to the client an indication of the total chunk number (e.g. 40 chunks or viewable pages in the document DOM structure). In the present application, a "chunk" may include up to 3000 bytes of data, which may be more or less then a page of actual text, depending on font styles, formatting, colors or document content. However, for ease of description, the terms "page" and "chunk" may be used interchangeably.

Figure 10:
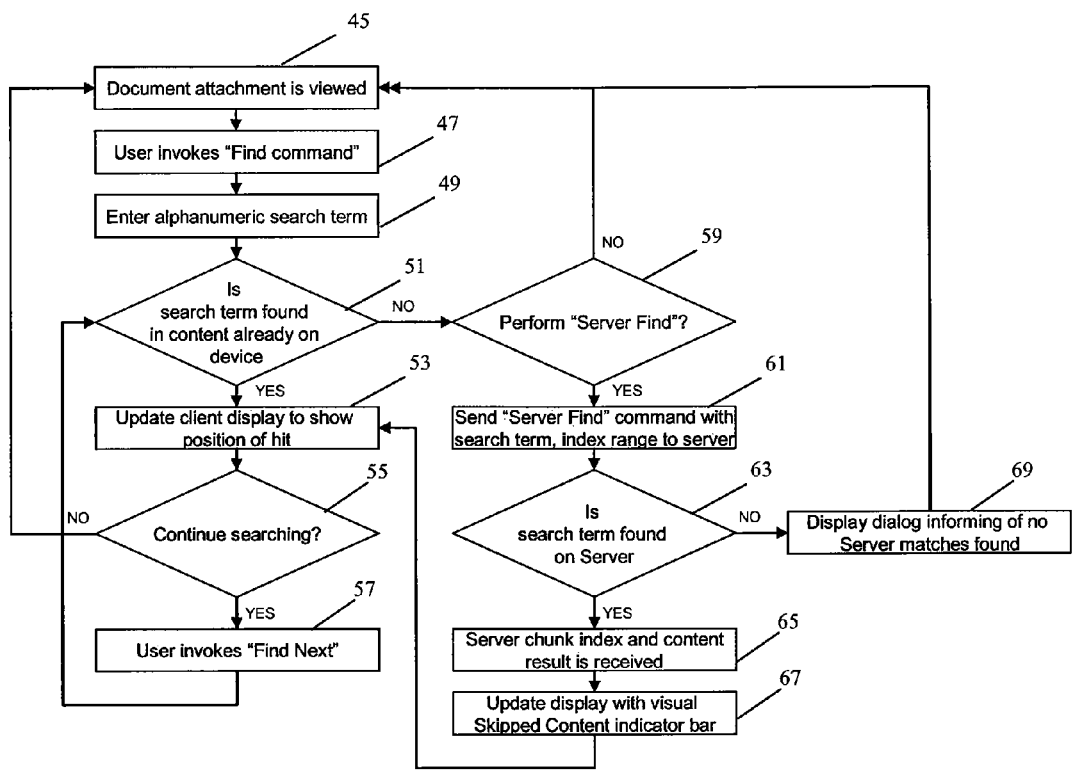
FIG. 10 is a flowchart showing steps in performing a device side request for initiating the server find command, according to a preferred embodiment.

Upon receiving the initial document content (i.e. the first chunk of data) from the server 28, the device 12 parses and displays the content (step 45 in FIG. 10). As is conventionally known, the user may invoke the "Find" command on the attachment viewer in response to which the user is prompted to enter an alphanumeric search term (step 47). The "Server Find" command of the present application is linked with the conventional "Find" and "Find Next" commands found in the attachment viewer of device 12. FIG. 8A shows a graphical user interface on the mobile device 12 for entering a search string to search a document attachment to be viewed on the device. After entering the search term (step 49), the attachment viewer (i.e. client) searches the first chunk of content on the device.

If a match is found (i.e. a YES at step 51), the client screen is updated (step 53) to reflect the found position of the search term by placing the cursor on top of the first letter of the matching alphanumeric text segment or word, as discussed in greater detail below with reference to FIG. 9. To continue searching the initial retrieved document content residing on the client device 12 (i.e. a YES at step 55), the user invokes the "Find Next" command in a recurring fashion (step 57).

For each match in the initial retrieved content already residing on the device 12, the client visually updates the display to reflect the position in the document content where the search term is encountered as indicated above.

If no further matches for the "Find" or "Find Next" command are encountered within document content on the client device 12 (i.e. a NO at step 51), a message is displayed informing the user that the searched text has not been found in the section of the document resident on the device. As shown in FIG. 8B, this message prompts the user to initiate a server side search for the requested text string.

If the user selects "Yes" a search is initiated through the remaining document content on the attachment server 28 that has not yet been retrieved by the device 12 (i.e. a YES at step 59). Specifically, the client device 12 sends a "Server Find" command to the server 28, containing the string to be searched and a chunk index range to search (step 61). For the example of FIG. 8A, the client issues a "Server Find" command to the server with the search term "comments" and a chunk index range to search of, for example, "2-40". The chunk index does not contain chunk 1 since chunk 1 is already residing on the device 12.

The server 28 then searches through the DOM for any document content containing the search word "comments" for chunk 2 through 40.

If the attachment server 28 encounters a match with the input search string (i.e. a YES at step 63), it returns the attachment section back to the attachment viewer of client device 12 (step 65), along with the chunk index where the match was found (e.g. if the next match is in chunk 20 then that chunk content is returned back to the client along with chunk index 20). The client 12 then parses and displays the contents (i.e. of chunk 20) and highlights the position of the search "hit" to the user. Also, the user is visually informed that the contents for chunks 2 through 19 resides back at the server 28 by inserting a visual "Skipped Content" indicator bar in between the contents of chunk 1-20. (step 67). As discussed above, the skipped content functionality is set forth in co-pending US patent application no. PUS2279. The match is indicated on the device 12 in a conventional manner (step 53) by highlighting the first character of the search string found in the retrieved content, as discussed in greater detail below.

If the user continues the search by selecting the conventional "Find Next" command while content still remains at the server 28 (step 57), then any subsequent match within the content of chunk 20 is displayed (step 53), as described previously. When no further matches are encountered within chunk 20, then the user is prompted again (FIG. 8B) to perform a server find operation if so desired.

The "Server Find" command is issued again (step 61) with the search term, but this time the requested chunk index is 21 through 40 since the client already knows that chunk 1 through 20 has been searched through. If an additional match is found in (e.g. chunk 39) then the content of chunk 39 and the chunk index number 39 are returned back to the client (step 65) for parsing and display. Again a "Skipped Content" visual indicator bar is inserted between the content of chunk 20 and chunk 39 (step 67) to indicate to the user that content still remains back at the server 28, which has not yet been retrieved to the device 12.

The server side search may be repeatedly performed until all sections with matches to the search string have been downloaded to the device 12. On execution of the final "Server Find" command, the server 28 searches through the DOM contents for chunk 40. In this case no further matches are found for the search term in the remaining chunk. Once that occurs, a "Reached end of section" dialog is presented to the user (step 69), as shown in FIG. 9. As indicated above, a match is indicated on the device 12 by highlighting the first character of the search string found in the retrieved content. This is illustrated in FIG. 9 (where the search string is "comments" and the first letter "c" is highlighted).

In conclusion, to use the example described above, the "Server Find" operation allows the client to search a 200 page document while retrieving only the chunks of content where a match is found, for parsing and display (e.g. chunk 1, 20 and 39), as opposed to retrieving a total of 40 chunks of contents back to the device for parsing and display to achieve the same result. Therefore the "Server Find" command greatly optimizes bandwidth, device storage usage and total response time for document search by only returning the relevant chunks or sections to the device 12 for viewing by the user.

Figure 11:
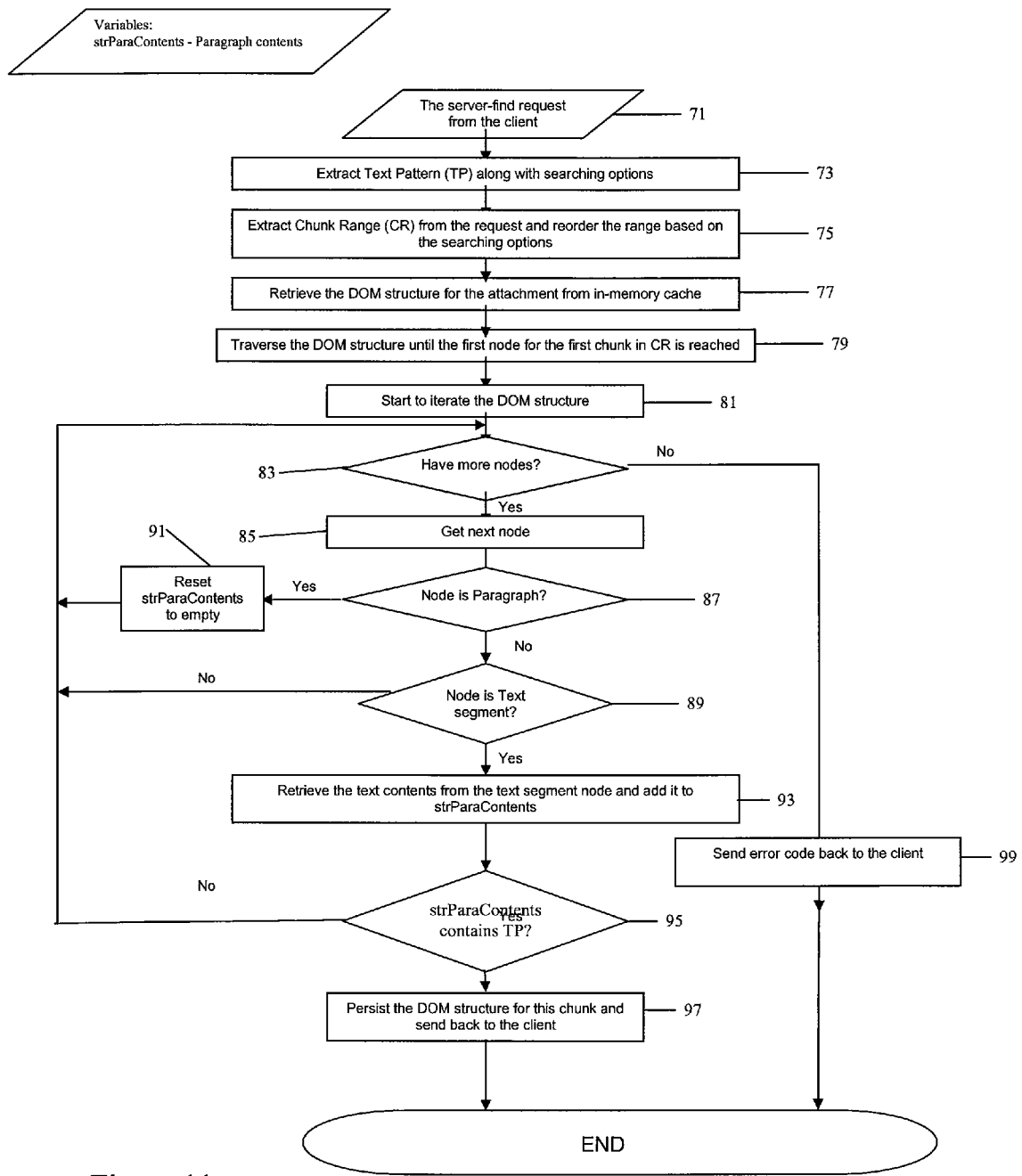
FIG. 11 is a flowchart showing steps in executing the find command within the server, according to the preferred embodiment.

Turning now to the server side process illustrated in FIG. 11, when the attachment server 28 receives a server find request for an attachment (step 71), it first extracts the text pattern to be searched (step 73) along with the various search options, i.e. case sensitive, forward or backward search, etc. In addition, the attachment server extracts from the request the chunk range to be searched and reorders the chunk range based on the search options (step 75).

After retrieving the pre-paginated document DOM structure for the attachment from the in-memory document DOM cache (step 79), the attachment server 28 traverses the DOM structure (step 81) until it reaches the start node for the first chunk in the chunk range. It continues to traverse the DOM structure (i.e. a YES at step 83 followed by step 85) and handle the nodes of command type paragraph (step 87) or text segment (step 89) in the DOM structure. When parsing the paragraph commands the attachment server 28 resets the internal variable paragraph text contents (step 91); retrieves the text contents stored in the text segment command and adds the text to the paragraph contents (step 93). The server then searches the text contents for the text pattern (step 95). The attachment server iterates through the DOM structure until the text pattern has been found or all the chunks in the chunk range have been searched (i.e. a NO at step 83). If no such text pattern is found in the DOM structure specified by the chunk range the attachment server will return an error (step 99). Otherwise the server returns the contents of the first chunk containing the text pattern (step 97).

The attachment server 28 may split the matching text contents into multiple chunks, but will always persist the DOM structure for the chunk where the matching text starts and indicate the number of characters of the text pattern contained in the persisted DOM structure in the response to the client 12.

A person skilled in the art, having read this description of the preferred embodiment, may conceive of variations and alternative embodiments, all of which are believed to be within the ambit of the claims appended hereto.

What is claimed is:

1. A process for locating a search string in a document stored on a server and displaying the search string on a mobile device, comprising:
    building and caching a graph structure within said server representing a map of said document, wherein said graph structure paginates said document into individual chunks for display on said mobile device;
    transmitting of successive chunks of said document from said server to said mobile device for display by said mobile device along with a total number of said individual chunks, said transmitting initiated at said mobile device;
    searching of a least one of said successive chunks within said mobile device based on invocation of a find command at said mobile device, said find command linked to a server find command and,
    in the event said search string is not located and the total number of said individual chunks has not been searched then automatically invoking said server find command thereby initiating a further search through remaining chunks within said server;
    in the event that said search string is located within said remaining chunks, transmitting a first chunk containing said search string; and
    in the event said search string is located in either said at least one of said successive or remaining chunks then highlighting said search string within a said chunk at said mobile device, and otherwise providing an indication at said mobile device of no matches found.

2. The process of claim 1, wherein initiating said further search comprises:
    sending said search string and an index range of said remaining chunks subsequent to said at least one of said successive chunks from said mobile device to said server;
    searching said remaining chunks within said index range for said search string; and
    in the event said search string is located then transmitting said first chunk containing said search string and an associated chunk index from the server to said device.

3. The process of claim 2, wherein said highlighting comprises updating a display of said device to reflect the position in the document where the search string is located.

4. The process of claim 3, further comprising generation of a display at said mobile communication device for prompting initiation of said further search through remaining chunks within said server.

5. The process of claim 4, further comprising generation of a skipped content indicator bar on said display between said successive chunks, thereby providing an indication of said remaining chunks within the server not yet been transmitted to the device.

6. The process of claim 5, wherein said searching said remaining chunks comprises:
    extracting said search string and said index range to be searched;
    iterating the graph structure and for each node in said range of remaining chunks parsing any paragraph and text commands, and for each paragraph command retrieving and storing any text content from said text commands in a paragraph content variable and searching said text content in said paragraph content variable for said search string; and
    upon locating said search string persisting said graph structure for each of said remaining chunks containing said search string and transmitting each of said remaining chunks and associated chunk indexes to said mobile device.

7. The process of claim 6, further comprising extracting search options along with said search string and index range, and reordering said index range based on said search options.

8. The process of claim 7, wherein said graph structure is a Document Object Model DOM.

9. A process implementable in a server for locating a search string in a document stored on the server comprising:
    building and caching a graph structure within said server representing a map of a document, wherein said graph structure paginates said document into individual chunks;
    transmitting successive chunks of said document along with a total number of said individual chunks;
    searching through remaining chunks within said server for a search string, said searching initiated upon receipt of a server find command; and
    in the event said search string is located in said remaining chunks then transmitting each of said remaining chunks containing said search string;
    wherein said searching further comprises:
    receiving said search string and an index range of said remaining chunks;
    searching said remaining chunks within said index range for said search string; and
    in the event said search string is located then transmitting a first chunk containing said search string and an associated chunk index.

10. The process of claim 9, wherein said searching further comprises:
    extracting said search string and said index range to be searched;
    iterating the graph structure and for each node in said range of remaining chunks parsing any paragraph and text commands, and for each paragraph command retrieving and storing any text content from said text commands in a paragraph content variable and searching said text content in said paragraph content variable for said search string; and upon locating said search string persisting said graph structure for each of said remaining chunks containing said search string and transmitting each of said remaining chunks and associated chunks indexes.

11. The process of claim 10, further comprising extracting search options along with said search string and index range, and reordering said index range based on said search options.

12. The process of claim 11, wherein said graph structure is a Document Object Model DOM.

13. A computer readable medium executable on a processor of a server for implementing the process of claim 9.

14. A process implementable on a mobile device for locating a search string in a document stored on a server comprising:

receiving and displaying successive chunks of a document;

searching at least one of said successive chunks for a search string based on invocation of a find command at said mobile device, said find command linked to a server find command and in the event said search string is located then highlighting said search string;

in the event said search string is not located automatically invoking said server find command thereby initiating a further search through remaining remotely stored chunks within said server; and otherwise providing an indication at said mobile device of no matches found.

15. The process of claim 14 further comprising updating a display of said device to reflect the position in the document where the search string is located.

16. The process of claim 15, further comprising generation of a skipped content indicator bar on said display between said successive chunks, thereby providing an indication of said remaining chunks within the server that have not yet been transmitted to the device.

17. A computer readable medium executable on a processor of a mobile device for implementing the process of claim 14.

18. A mobile device process comprising:

receiving and displaying successive chunks of a document;

searching at least one of said successive chunks for a search string based on invocation of a find command at said mobile device, said find command linked to a server find command and in the event said search string is located then highlighting said search string by updating a display of said mobile device to reflect the position in the document where the search string is located, and generating a skipped content indicator bar on said display between said successive chunks, thereby providing an indication of said remaining chunks within the server not yet been transmitted to the device;

in the event said search string is not located automatically invoking said server find command thereby initiating a further search through remaining remotely stored chunks within said server; and otherwise providing an indication at said mobile device of no matches found.

* * * * *